(12) United States Patent
Ghoneim et al.

(10) Patent No.: US 6,212,461 B1
(45) Date of Patent: Apr. 3, 2001

(54) EXTENDED BRAKE SWITCH SOFTWARE FOR VEHICLE STABILITY ENHANCEMENT SYSTEM

(75) Inventors: Youssef Ahmed Ghoneim, Macomb Township, Macomb County; David Michael Sidlosky, Huntington Woods, both of MI (US)

(73) Assignees: General Motors Corporation, Detroit; Delphi Technologies Inc., Troy, both of MI (US)

( * ) Notice: Subject to any disclaimer, the term of this patent is extended or adjusted under 35 U.S.C. 154(b) by 0 days.

(21) Appl. No.: 09/322,041

(22) Filed: May 28, 1999

(51) Int. Cl.$^7$ ........................................................ B60T 8/32
(52) U.S. Cl. ............................. 701/70; 303/183; 303/191
(58) Field of Search ................................. 701/70, 74, 76, 701/34; 303/122.04, 122.05, 177, 183, 191; 180/197

(56) References Cited

U.S. PATENT DOCUMENTS

| | | | |
|---|---|---|---|
| 5,480,221 | * | 1/1996 | Morita et al. ...................... 303/113.5 |
| 5,720,533 | | 2/1998 | Pastor et al. ........................... 303/147 |
| 5,746,486 | | 5/1998 | Paul et al. .............................. 303/146 |

* cited by examiner

*Primary Examiner*—Michael J. Zanelli
(74) *Attorney, Agent, or Firm*—George A. Grove

(57) ABSTRACT

A process is disclosed for use in a micro-processor managed brake control system that utilizes wheel speed sensors and a brake off/on switch when the system requires information as to whether the vehicle is experiencing hard braking. In accordance with the process, the average deceleration of the undriven wheels is estimated and the slip of each undriven wheel is estimated and the results are compared with predetermined values for these parameters over a suitable test period. At the conclusion of these tests, the data may be used in place of data from a brake pedal position sensor or to confirm the data from such a sensor.

10 Claims, 2 Drawing Sheets

EXTENDED BRAKE SWITCH SOFTWARE FOR VEHICLE STABILITY ENHANCEMENT SYSTEM

TECHNICAL FIELD

This invention relates to a process and apparatus for determining whether the driver of a vehicle is effecting "hard" braking of the vehicle. This practice is useful in computer-controlled vehicle braking and traction control systems and in vehicle stability enhancement systems involving yaw rate measurements or estimations.

BACKGROUND OF THE INVENTION

Automotive vehicles have been produced with computer-controlled brake systems that modulate brake force during stops to provide anti-lock brake (ABS) control and/or that modulate brake force during vehicle acceleration to provide positive acceleration traction control (TCS). Recently, more comprehensive computer-based vehicle brake control systems have been developed that provide additional chassis control under braking or positive acceleration conditions. Such systems are described, e.g., in U.S. Pat. Nos. 5,720,533 and 5,746,486, both entitled "Brake Control System" and assigned to the assignee of this invention. These systems seek to control, among other parameters, the yaw rate of the vehicle.

The computer in the chassis control systems described in these patents uses signals from a variety of sensors such as wheel speed sensors, steering wheel angle sensor, brake switch sensor, brake pedal extended travel sensor, master brake cylinder pressure sensor, yaw rate sensor and a lateral accelerometer. For further development of such control systems, it is desirable and/or necessary to provide algorithms or computer-controlled processes for eliminating some of such sensors or for detecting faults in their operation.

For example, a process has been developed that permits vehicle yaw control based on an estimated yaw rate rather than the output of a yaw rate sensor. This practice is described in U.S. Ser. No. 09/080,372, entitled "Vehicle Yaw Control Based on Yaw Rate Estimate" and assigned to the assignee of this invention. While this yaw rate estimate practice can eliminate the use of a yaw rate sensor, it does use the output of a brake pedal travel sensor to measure the extent of driver braking. Such a sensor is expensive compared to a marginal increase in on-board computer processing capacity and, furthermore, the sensor is subject to failure.

Accordingly, it is an object of this invention to provide a process for determining whether a brake pedal travel sensor is faulty or for eliminating the need for input from such a sensor, especially in making computer-based estimates of vehicle yaw rate.

SUMMARY OF THE INVENTION

This invention is typically applicable in automotive vehicles incorporating a computer-based antilock brake system (ABS) or a traction control system (TCS) in combination with vehicle yaw control. It is applicable in such systems in which at least two of the vehicle wheels, i.e., the front wheels or the rear wheels, are undriven. In vehicle control systems of this type, the micro-processor-based controller receives data from wheel speed sensors and a brake off/on switch, among other possible data sources, in the course of its control of brake actuators for each wheel. In many such control systems, it also necessary to employ a brake pedal travel sensor so that the controller receives more data concerning whether the driver is pressing heavily on the brake pedal and has thus effected a hard brake condition.

Reliance upon a brake pedal travel sensor, or extended brake switch as it is sometimes called, presents three possible disadvantages. Such a switch adds expense and it may not work properly. Finally, the hydraulic brake pressure obtained from a fully-actuated brake is constant and independent of road surface conditions. This means that a 300 psi brake pressure on a dry surface that might not corrupt the wheel speed of an undriven wheel, might cause a wheel lock-up on ice and result in a bad yaw rate estimation. Therefore, one setting of the extended brake switch travel is not adequate for the yaw rate estimation.

This invention provides a method of determining a hard brake condition and, therefore, provides a substitute for a brake pedal travel sensor. In an alternative embodiment, the invention also provides a means for determining the effectiveness of such a sensor. In accordance with the method, the speed (i.e., velocity in, e.g., meters per second) of the undriven wheels is measured using available wheel speed sensors. This data, utilized over a suitable number of controller processing cycles, is used to calculate the average acceleration of the undriven wheels. Data from all wheel sensors may be used to determine values of instantaneous vehicle velocity. The velocities of the undriven wheels (e.g., the right and left rear wheels in a front wheel drive vehicle) at a time of interest and the corresponding vehicle velocity are used to calculate slip values of the undriven wheels.

The average acceleration (appropriately, deceleration) of the undriven wheels and the slip values are compared with predetermined threshold values for these parameters. If the average deceleration and/or the respective slip values (determined at, e.g., successive 0.010 second increments) exceed the corresponding threshold deceleration and slip values throughout a suitable comparison period (for example, 0.25 second), a hard braking condition is affirmed. On the other hand, when such calculated values do not exceed the respective threshold values during a like comparison period, it is concluded that a hard braking condition does not exist.

In a preferred embodiment of the invention, data indicating that the ABS is actuated or data from a brake on/off switch can be used to bypass entry into this controller process.

The above described process was illustrated as replacing a brake pedal travel sensor but it could also be used to confirm a signal, positive or negative, from such a sensor.

Other objects and advantages of the invention will become apparent from a description of a preferred embodiment which follows. In the description, reference will be had to the drawings which are described in the following section of this specification.

DESCRIPTION OF THE PREFERRED EMBODIMENT

The process aspect of this invention may be utilized as a substitute for a brake pedal travel sensor in an active brake control system, or it may be used to determine whether such a sensor is providing correct data. In this embodiment of the invention, it will be described as a substitute for the brake pedal travel sensor (or an extended brake switch as it is sometimes called). The term "hard braking" can refer to a range of braking conditions when the operator has depressed the brake pedal past actuation of the brake pedal on/off switch. But the process aspect of this invention is particularly useful when the brake pedal depression has not activated the ABS system.

Figure 1:
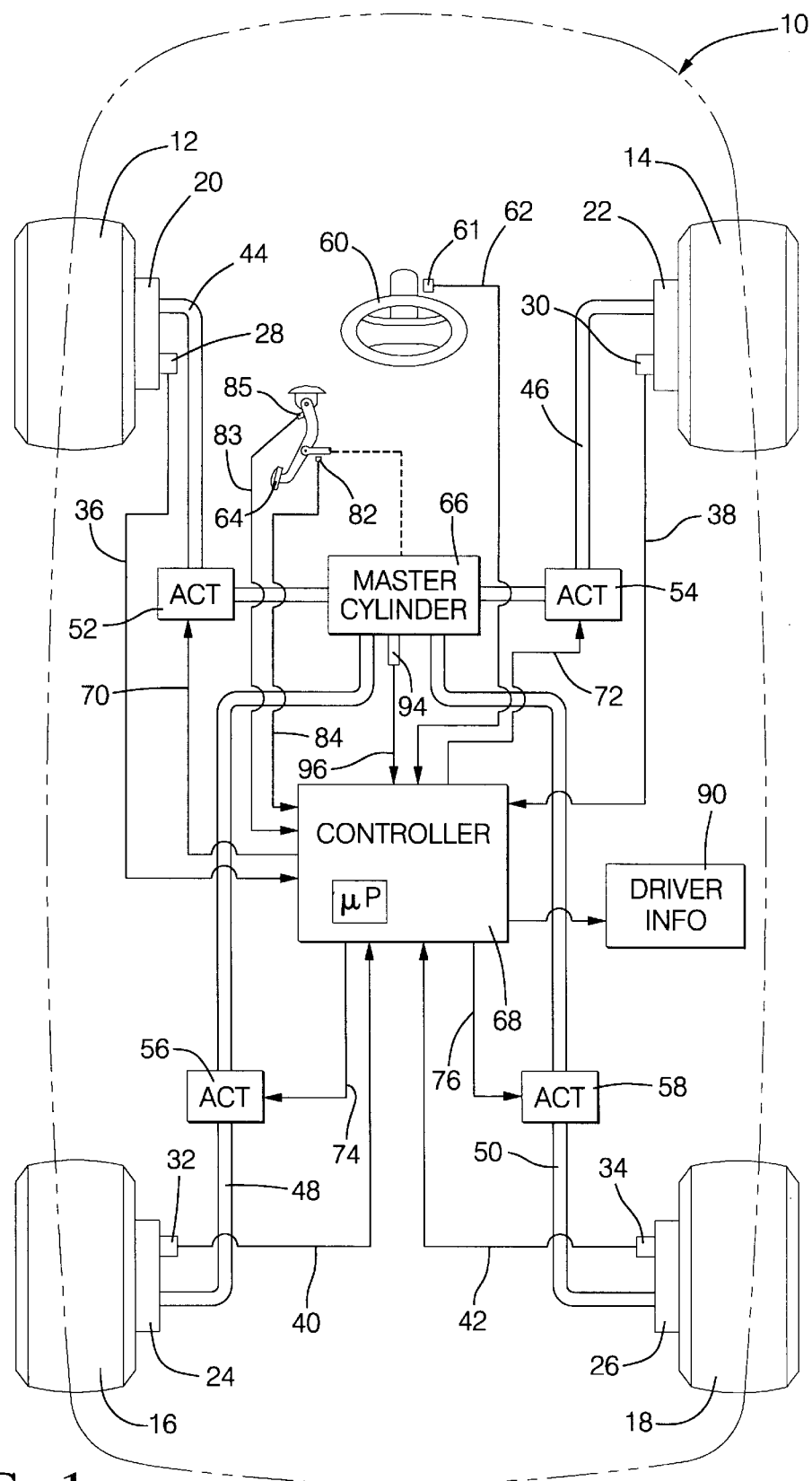
FIG. 1 is a diagram of a vehicle including an electronic controller and associated input and output devices constituting an exemplary control system for carrying out an active brake control of vehicle yaw.

FIG. 1 depicts a mechanization of an active brake control system. The vehicle 10 includes a brake system having a micro-processor based controller 68 for controlling the brakes 20, 22, 24, 26 of the respective wheels 12, 14, 16, 18. The controller 68 receives various inputs, including wheel speed signals on lines 36, 38, 40, 42 from respective wheel speed sensors 28, 30, 32, 34; a brake pedal 64 on/off switch 85 signal on line 83; a brake pedal travel signal on line 84 from pedal travel sensor 82; a steering wheel 60 angle signal on line 62 from angle sensor 61; and a master cylinder 66 pressure signal on line 96 from the pressure sensor 94. The sensors 28, 30, 32, 34, 61, 82, 85, 94 may be implemented with conventional devices in a manner known to those skilled in the art.

Under certain conditions such as wheel lock-up or spinning, or lateral instability, the controller 68 modifies the normal braking of one or more wheels 12, 14, 16, 18 via the respective actuators 52, 54, 56, 58 in order to restore a desired overall operation of the vehicle. In an incipient lock-up condition, the controller 68 commands one or more of the respective actuator(s) 52, 54, 56, 58 to modulate the brake force developed at the wheel(s) experiencing the condition. In a wheel slip condition, the controller 68 commands one or more of the respective actuator(s) 52, 54, 56, 58 to develop brake force at the slipping wheel(s). In a case of lateral instability, the controller 68 commands one or more of the respective actuator(s) 52, 54, 56, 58 to selectively increase or decrease the brake forces generated at the various wheels 12, 14, 16, 18 to produce a commanded yaw; the control may be carried in a two-channel system in which only the front brakes 20, 22 are controlled, or a four-channel system in which all four brakes 20, 22, 24, 26 are controlled.

As stated above, detailed descriptions of processes utilizing the above-described sensors and actuators in a process for a brake control system is described in U.S. Pat. Nos. 5,720,533 and 5,746,486 assigned to the assignee of this invention, and a process for vehicle yaw control based on yaw rate estimate is further described in pending application U.S. Ser. No. 09/080,372, also assigned to the assignee of this invention. The subject invention is a subprocess or subroutine that may be used in place of extended brake switch or brake pedal travel sensor 82 and the brake pedal travel signal on line 84, both as seen in FIG. 1.

Figure 2:
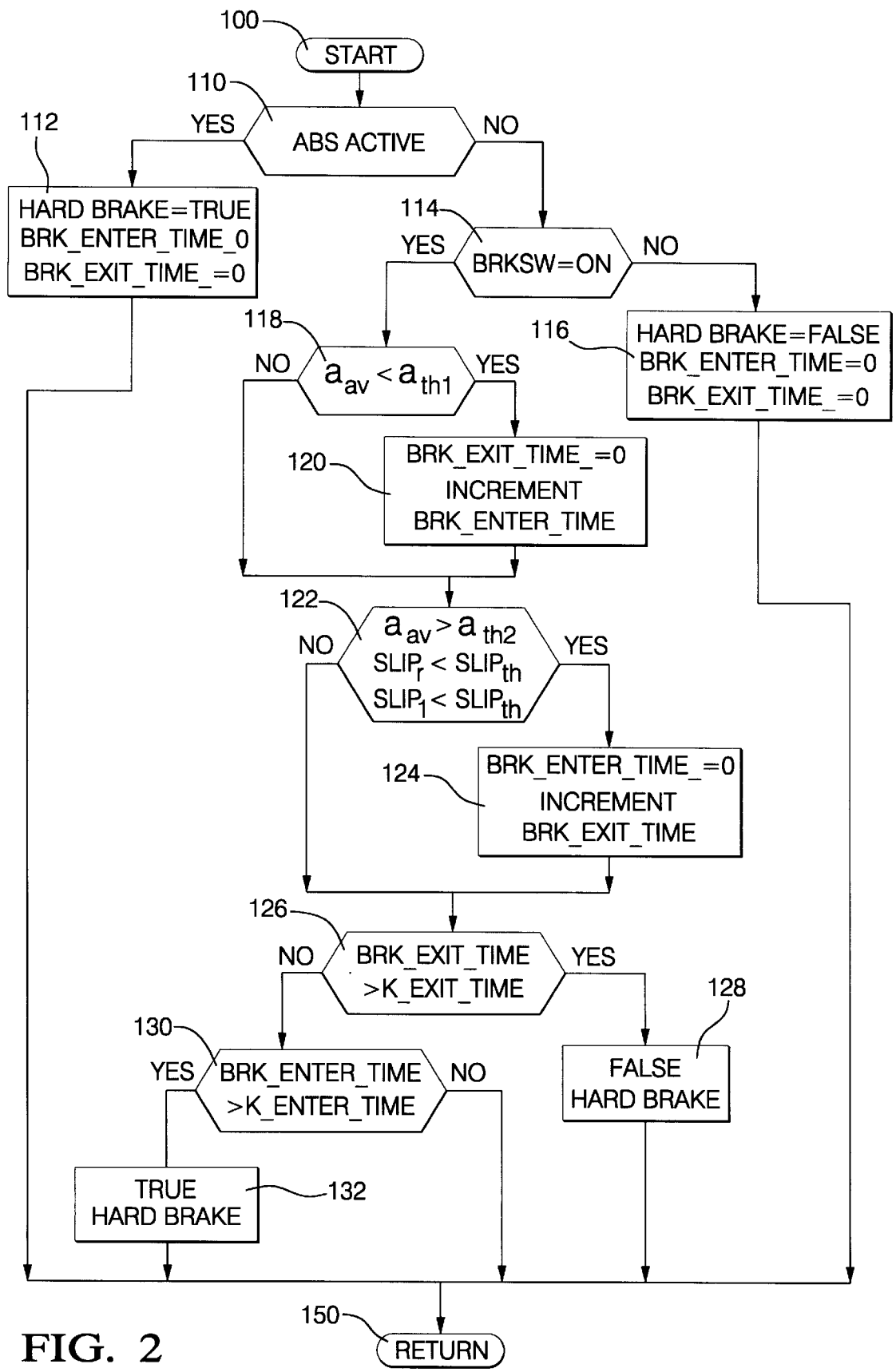
FIG. 2 is a flow diagram representative of processing steps of this invention executed by a micro-processor controller as designated in FIG. 1.

FIG. 2 is a flow diagram illustrating processing steps to be executed by an electronic controller as indicated in FIG. 1. Execution of the process provides the brake pedal travel sensor equivalent signal of this invention. Thus, the present invention includes apparatus and process to decide whether the driver is effecting "hard" braking.

The process uses data from the wheel velocity sensors and the brake switch to calculate or estimate vehicle velocity, the average velocity and acceleration (usually deceleration) of the undriven wheels and computes the slip values of the undriven wheels. When the ABS is not active and undriven wheel average acceleration values or slip values exceed predetermined threshold values of these parameters, the computations and comparisons are repeated over a representative period of time to confirm the presence of hard braking.

Structurally, therefore, this invention uses means for measuring the speeds of the undriven wheels and means for detecting on/off brake switch position. It also uses a microprocessor programmed to compute the undriven wheel deceleration and the wheel slips of the undriven wheels and to compare these calculated values with predetermined threshold values over timed intervals. As depicted in FIGS. 1 and 2, a suitably programmed conventional microprocessor and memory and conventional sensors are employed.

Referring to FIG. 2, the START block 100 indicates the entry of a micro-processor cycle into the subroutine which determines whether hard braking is occurring or not. This entry would occur, for example, at a time when a vehicle yaw system needed to know whether a driver had effected hard braking.

In the first step, the micro-processor tests at block 110 whether the vehicle antilock brake system (ABS) is active. The micro-processor has stored this information as part of its broader process execution. If the ABS is active, breaking is in effect and the HARD BRAKE flag is set as true (e.g., value 1) at block 112. The hard brake test (BRK) enter time is set at zero (see BRK_Enter_Time=0) and the hard brake test exit time (BRK_Exit_Time) is likewise set to zero, and the process exits to the RETURN block 150. In this situation and at this point, the controller 68 continues with its broader brake control responsibility and only returns to this subroutine during its next inquiry cycle, for example, ten milliseconds later.

If it is determined at test block 110 that the ABS is not active, the process proceeds to block 114 and tests for the position of the brake off-on switch (for example, switch 85 in FIG. 1). Referring to block 114, if BRKSW=NO (or off), the HARD BRAKE flag is set at False or off, the hard brake test enter time is set at zero (BRK_Enter_Time=0) and the hard brake test exit time is likewise set at zero (BRK_Exit_Time=0), and the process goes to the RETURN block 150. Again, at this point the controller 68 continues with its broader brake control processing responsibility and only returns to this sub-routine START block during its next inquiry cycle about 0.010 second later.

If in block 114 BRKSW=ON (yes), the process sequence proceeds to test block 118 wherein an average value of acceleration of the undriven wheels is compared with a predetermined threshold value of average acceleration for such wheels. Of course, in a braking situation, the values for acceleration will be negative because the velocity of the wheels will be decreasing. In order to make the test contemplated in block 118, data from wheel velocity or wheel speed sensors for the undriven wheels are obtained from data memory. The data may be in radians or in meters per second. If the data is available in radians, it is multiplied by the known radius of the wheel in meters to get velocity data in meters per second. Average values for the velocities and accelerations of the undriven wheels ($\omega_{av}$, $a_{av}$) at a current time k is estimated as a function of current and previous average wheel speed and acceleration ($\omega_{av}$, $a_{av}$) values (time, k−1) in accordance with the following equation (1) and equation (2):

$$\omega_{av}(k) = (1-Tg_1)\omega_{av}(k-1) + Tg_1\omega_{av}(k) + Ta_{av}(k-1) \quad (1)$$

$$a_{av}(k) = a_{av}(k-1) + Tg_2[\omega_{av}(k) - \omega_{av}(k)] \quad (2)$$

where T is the sampling time, e.g., every 0.010 second, and $g_1$ and $g_2$ are gain terms calculated from the following equations:

$$g_1 = 2\xi(2\pi f_n);$$

$$g_2 = (2\pi f_n)^2$$

where $\xi$ is the desired damping ratio of the vehicle body, e.g. about 0.7, and $f_n$ is the desired band width, e.g., 2 hertz. The damping ratio, $\xi$, governs the convergence of the estimated and true acceleration, while the bandwidth, $f_n$, determines the maximum frequency content of the acceleration to be included in the estimation. The designation (k) refers to the current control loop, and the designation (k−1) refers to the prior control loop.

Referring to block 118, a test is executed to determine if the average acceleration of the undriven wheels, $a_{av}$, is less than a first threshold value of the acceleration, $a_{th1}$. As stated, it is expected that in a braking situation, the estimated acceleration value will be minus. If in the test in block 118, the estimated average acceleration of the undriven wheels at time k is less than the first threshold value of acceleration, $a_{th1}$, it means that $a_{av}$ has a greater negative value. Thus, a suitable value for $a_{th1}$ might be −0.1g to −0.2g, where g is the value of acceleration due to gravity. If the value of $a_{av}$ at time k was, e.g., −0.5g, then the result of test block 118 would be YES for that interval. This is an indication of a possible hard braking condition.

When the result in block 118 is YES, the process proceeds to block 120. In block 120, BRK_Exit_Time is set at zero and the BRK_Enter_Time is incremented one unit, e.g., from zero to one. The purpose of block 120 is to start an evaluation period for hard braking, that might be up to twenty five sampling times of 0.010 second each in duration, in which to determine a stable braking condition situation. From block 120 the process proceeds to a second, more definitive test block 122.

Thus, a purpose of the process step of test block 118 is to provide a "screening test" to start or further increment BRK_Enter_Time for further analysis by process recycling. As will be seen in reference to test block 130, when the process has incremented BRK_Enter_Time to a predetermined value, K, then the process has determined that a HARD BRAKE condition exists.

If the block 118 test fails and the answer is NO, then the process still proceeds to block 122. In block 122, three definitive tests are made. The average value of acceleration of the undriven wheels, $a_{av}$, is compared with a second threshold value of average acceleration, $a_{th2}$, to see if it is larger than $a_{th2}$, i.e., it is not a larger negative value. An example of a suitable value for $a_{th2}$ is −0.1g to −0.15g.

In addition to the acceleration test, the slip of the right undriven wheel is calculated in accordance with equation (3) below. The slip of the left undriven wheel is calculated in accordance with equation (4) below.

$$\lambda_r(k) = \frac{V_x(k) - \omega_r(k)}{V_x(k)} \quad (3)$$

$$\lambda_l(k) = \frac{V_x(k) - \omega_l(k)}{V_x} \quad (4)$$

where $V_x(k)$ is the vehicle speed at current time k, $\omega_r(k)$ is the right undriven wheel speed at current time k and $\omega_l(k)$ is the left undriven wheel speed at current time k. The value of vehicle speed, $V_x$, at time k is estimated from a combination of the velocities of the driven wheels in accordance with known practices.

The respective slip values, $\lambda_r$ and $\lambda_l$, for the undriven wheels are compared with a threshold value of slip, $\lambda_{th}$, for both wheels. A suitable threshold slip value, $\lambda_{th}$, may be 0.05. The tests are whether the average acceleration is greater than the second acceleration threshold value (i.e., less negative value) and whether the calculated slip values for the undriven wheel are both less than the slip threshold value.

If the three tests are all met (the result is YES), the process proceeds to block 124. If the answer to all three tests is yes, this is an indication that at that moment a hard braking situation does not exist and it is time to consider an exit option. Therefore, in block 124, BRK_Enter_Time is set at zero and BRK_Exit_Time is incremented by one value. The process proceeds to block 126.

If any of the tests in block 122 fail (NO), then there is a possibility of hard braking and the process proceeds directly to block 126. In block 126, the micro-processor tests whether BRK_Exit_Time is greater than a pre-set value of k cycle units. This value may, for example, be equivalent to twenty-five of the processing times of the micro-processor. For this program, a unit of time may be 10 milliseconds. Since the BRK_Exit_Time in incremented only when a braking situation is not indicated, the accumulation of enough increments confirms the absence of bard braking.

Thus, if the answer to the block 126 test is YES, the process proceeds to block 128 where HARD BRAKE flag is set at FALSE. The process proceeds to Return block 150 and awaits the next Start cycle.

If the answer to the block 126 test is NO, the process proceeds to test block 130. The process arrives at block 130 only when some upstream indication of hard braking has occurred.

In test block 130 it is determined whether BRK_Enter_Time has incremented to a certain test value, K. The arrival at K occurs because indications of hard braking have continued over K cycles. As suggested above, K may be about 25 cycle times. If the answer to the block 130 test is NO, the process proceeds to Return block 150 and awaits the next Start cycle.

If BRK_Enter_Time has reached the pre-set value, K, the process proceeds to block 132 in which it is established that the hard brake situation is in effect. HARD BRAKE flag is turned on or set as TRUE indicating to controller 68 that the brake pedal travel sensor has been actuated in a hard braking situation. The process then proceeds to Return block 150 and awaits the next process Start cycle.

The HARD BRAKE flag, or its absence, is then utilized in a brake control process, or the like, such as those described above. Alternatively, the flag is used to confirm that the hard brake sensor is working properly and the process need not be repeated until it is determined that such a test should prudently be conducted again.

Thus, the process of this invention provides an initial test of hard braking once it has been determined that the ABS is not active and the break off/on switch is ON. The initial test is a comparison of the average deceleration of the undriven wheels with a predetermined threshold value of this parameter. If this test shows the possibility of hard braking then a break test timer is started. A more comprehensive group of undriven wheel acceleration and slip tests are than undertaken to better demonstrate the presence or absence of hard braking. Depending upon the results of this three part test the test enter counter is incremented or the test exit counter is incremented. No flag is set, no decision is made until the process has cycled a predetermined number of times and given a consistent answer.

While the invention has been described in terms of a preferred embodiment, it will be appreciated that other forms of the invention could readily be adapted by those skilled in the art. Accordingly, the scope of the invention is to be considered limited only by the following claims.

What is claimed is:

1. A method of determining a condition of hard braking in a vehicle having a brake off/on switch and a pair of undriven wheels, the method comprising:

measuring the speed of each undriven wheel and determining the average deceleration of said wheels, determining wheel slip values of the undriven wheels and comparing said deceleration and slip values with predetermined threshold values of these parameters over a predetermined comparison period to determine a said hard braking condition.

2. A method as recited in claim 1 further comprising determining that the position of said off/on brake switch is on as a precondition to measuring said wheel speeds.

3. A method as recited in claim 1 further comprising determining that at least one of (a) the average deceleration of said undriven wheels and (b) a slip value of an undriven wheel continually exceeds the respective threshold deceleration or wheel slip value over a predetermined comparison period before affirming a condition of hard braking.

4. A method as recited in claim 1 further comprising determining that the average deceleration of said undriven wheels and the slip values of both undriven wheels remain less than the corresponding deceleration and slip threshold values over a predetermined comparison period before affirming the absence of a condition of hard braking.

5. A method as recited in claim 1 further comprising using the result of the comparison of said deceleration and slip values in place of data from a brake pedal position sensor.

6. A method as recited in claim 1 further comprising using the result of the comparison of said deceleration and slip values to test data obtained from a brake pedal position sensor.

7. A method of determining a condition of hard braking in a vehicle having a brake off/on switch and a pair of undriven wheels, the method comprising:

measuring the speed of each undriven wheel and determining the average deceleration of said wheels;

making a first comparison test comprising comparing said average deceleration with a predetermined threshold value of said deceleration;

determining wheel slip values of the undriven wheels; and making a second comparison test comprising comparing said deceleration and slip values with predetermined threshold values of these parameters;

said measuring, determining and first and second comparison steps being repeated over a predetermined comparison test period to determine the presence or absence of a said hard braking condition.

8. A method as recited in claim 7 further comprising determining that at least one of (a) the average deceleration of said undriven wheels and (b) a slip value of an undriven wheel continually exceeds the respective threshold deceleration or wheel slip value over a predetermined comparison period before affirming a condition of hard braking.

9. A method as recited in claim 7 further comprising determining that the average deceleration of said undriven wheels and the slip values of both undriven wheels remain less than the corresponding deceleration and slip threshold values over a predetermined comparison period before affirming the absence of a condition of hard braking.

10. A method as recited in claim 7 further comprising using the result of said repeated comparisons in place of data from a brake pedal position sensor.

* * * * *